Figure 1:
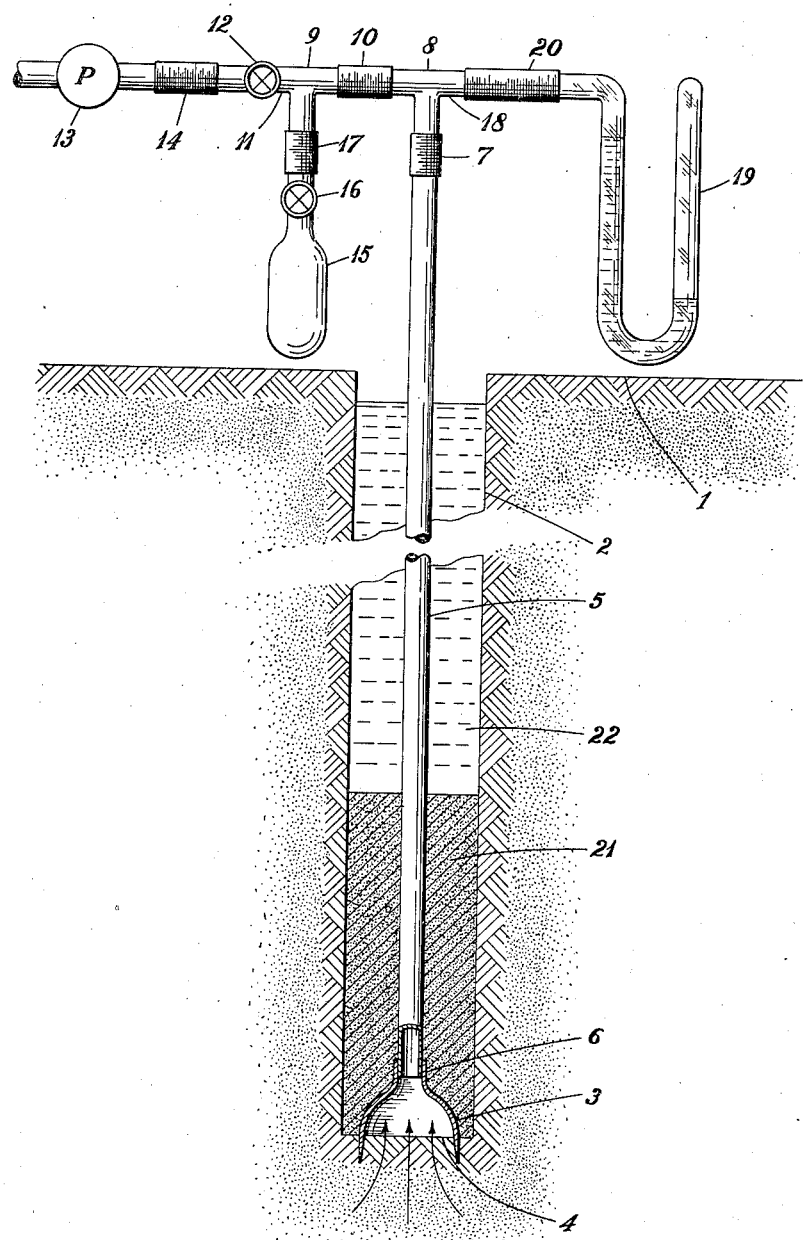

Nelson P. Stevens
INVENTOR

Aug. 23, 1949.          N. P. STEVENS          2,479,787
              GEOPHYSICAL PROSPECTING METHOD
Filed Dec. 23, 1944                          2 Sheets-Sheet 2

Nelson P. Stevens
INVENTOR
BY John L. Sullivan
AGENT

Patented Aug. 23, 1949

2,479,787

UNITED STATES PATENT OFFICE 2,479,787

GEOPHYSICAL PROSPECTING METHOD

Nelson P. Stevens, Dallas, Tex., assignor, by mesne assignments, to Socony-Vacuum Oil Company, Incorporated, New York, N. Y., a corporation of New York Application December 23, 1944, Serial No. 569,560

2 Claims. (Cl. 23—230)

This invention relates to geochemical exploration for hydrocarbon deposits such as oil and gas. The invention more particularly concerns a method for determining the presence and/or location of buried petroliferous deposits by the chemical analysis of soil gas.

By collecting and analysing numerous soil gas samples in the vicinity of known petroleum deposits, I have discovered that the content of oxygen and carbon dioxide in soil air in such vicinities varies in an anomalous manner which is readily relatable to the presence and location of the underlying petroleum deposits.

Although the exact reason for the existence of oxygen-carbon dioxide anomalies in the soil air in the vicinity of buried petroliferous deposits is not known to me at the present time, it seems probable that these anomalies are related to the existence of gaseous emanations derived from petroliferous deposits and therefore to the deposits themselves. Thus, it is already well recognized that gases, particularly hydrocarbons, such as ethane, emanate from deep seated petroliferous deposits and migrate upwards through the earth and it is possible that such emanations have effected significant changes in the amounts of oxygen and carbon dioxide normally present in the soil air overlying these deposits. The processes and/or reactions which produce these changes are evidently complicated in nature and depend upon a number of variable factors. However it is my belief, though I do not wish to limit my invention by any theoretical considerations, that the overall significant effects produced in the oxygen-carbon dioxide balance are related to soil gas admixture and/or reaction with hydrocarbon emanations, which processes, occurring over long periods of time, have attained an equilibrium condition which is reflected in the oxygen-carbon dioxide balance of the soil gas. This balance is thus markedly different over oil accumulations as compared to background values over barren areas.

In its broadest aspect, my invention comprises the steps of recovering soil gas samples from the earth at spaced points in a prospect area, analysing the samples to determine their oxygen and carbon dioxide contents and interpreting the analytical results to detect the presence of anomalies which are indicative of the possible presence of petroleum deposits.

In one specific embodiment of my invention, the interpretation of the analytical data involves plotting the values for the percentage ratios of oxygen to carbon dioxide in the various soil gas samples as a function of the sampling locations along a traverse in a prospect area. In this way, a curve is obtained which possesses a characteristic positive anomaly over the petroleum pool. By sampling from points along several or more traverses in a prospect area and plotting the analytical results in a similar way the boundaries of the underlying pool may be discovered and mapped.

It is a prime object of my invention to provide a novel method of geochemical prospecting whereby more accurate and dependable indications of the location of petroliferous deposits are attainable.

Another object is to provide a method of prospecting for petroliferous deposits by soil gas analysis whereby the significant constituents may be measured by means of a simple and rapid analytical procedure.

Figure 2:
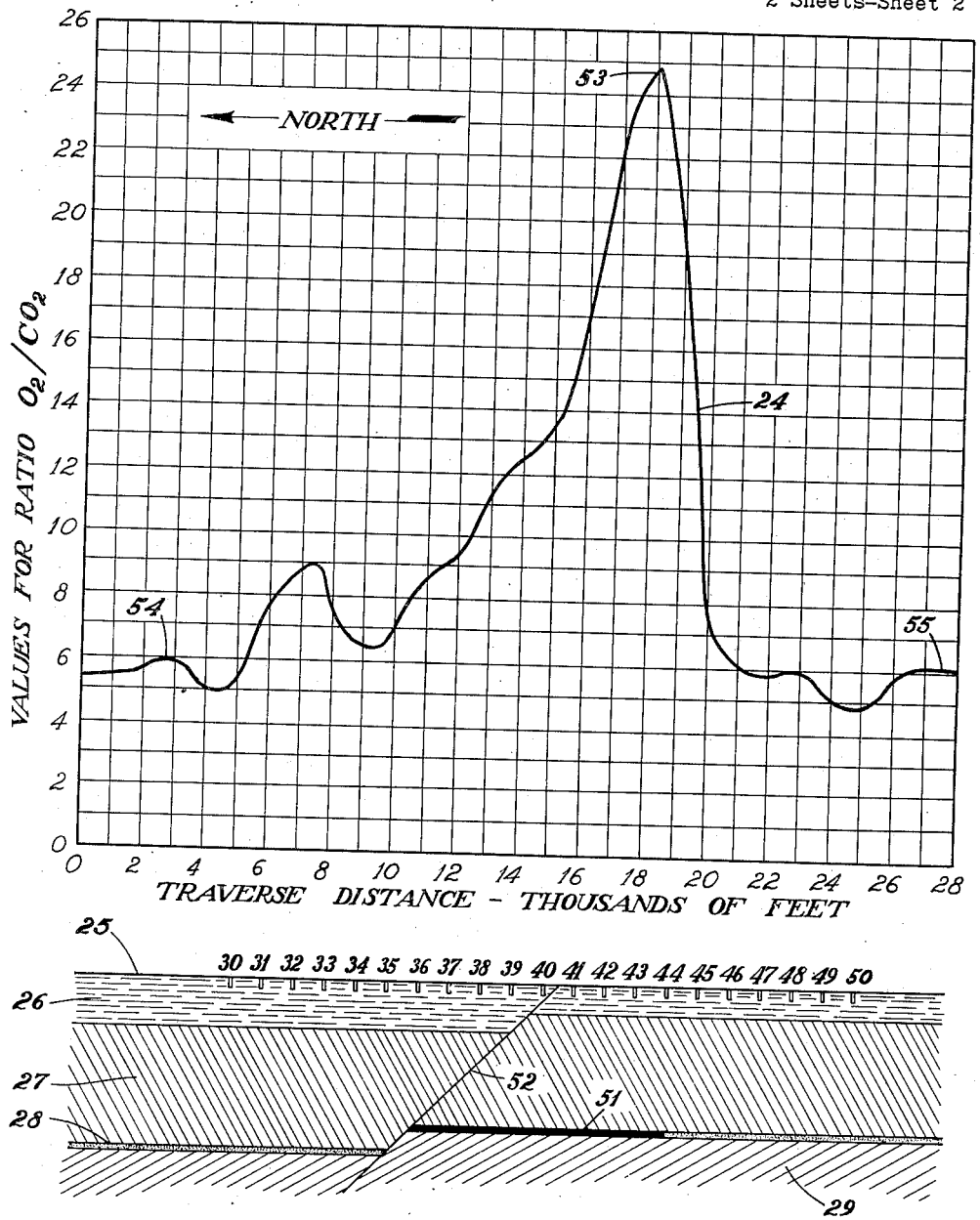

Other and further objects of my invention will be apparent from the following detailed description thereof taken in connection with the accompanying drawings in which Figure 1 shows a borehole in vertical section with soil gas sampling apparatus installed therein for use in accordance with the method of the invention; and Figure 2 graphically illustrates the correlation between the oxygen-carbon dioxide ratio in the soil gas and the location of the oil pool in a survey conducted in accordance with the method of the invention at the Talco oil field in northeast Texas.

In the practice of my invention, a number of test holes are drilled in the area to be investigated. Generally, I prefer to drill the holes at suitably spaced intervals of say 2000 feet along a traverse, or a number of traverses, in the prospect area. Where indications of anomalies are found by the original tests however, stations are then set at closer intervals in order that a more detailed study of the area can be made.

It is important that the test holes be bottomed below the level of "soil breathing" in order to avoid the vitiating effect of this phenomenon on the analytical results. As is well known, "soil breathing" is that movement of air and gases within the soil at shallow depths initiated by fluctuations in surface temperature and pressure conditions. It is generally advantageous to bottom the holes below the zone of water saturation, but not necessarily, especially where the water saturation zone is located at a very considerable depth below the surface and/or the water bearing strata are of relatively high porosity and have a high water content. Again, where it is practicable to do so, the holes should be bottomed so that all the samples are recovered from the same earth stratum, the depth of the holes being varied accordingly if necessary. I have found that when this latter procedure is followed, the results obtained are more reliable, due to the fact that conditions within the different sampling zones are more nearly the same. Thus, for example, the porosity and/or the absorptive character of any one stratum are likely to be substantially constant. This constancy of sampling conditions acts to eliminate errors which would otherwise be introduced into the results obtained.

After the test holes have been drilled, the recovery of the gas samples may be effected by any practical method which is capable of providing a soil gas sample which is uncontaminated by surface air. However, a method which I have found particularly satisfactory for this purpose employs a bell shaped piece of apparatus which is hereinafter referred to as the sampling head. The sampling head is made of a strong, heavy metal, such as steel. The open end is formed having an edge which is relatively thin compared to the main body portion, while the closed end is drilled and tapped for the purpose of making an air-tight attachment of a small diameter pipe thereto.

In practice, the sampling head with a suitable pipe attached is lowered into the test hole and set firmly in place at the bottom thereof, open end down, its edge dug firmly into the earth. The pipe is made sufficiently long to reach upwards through the hole to a point above the surface. The hole is then filled in by first adding sufficient dry dirt to cover the sampling head and then an aquagel mud to about surface level. A suitable vacuum pump, a pressure measuring device and an evacuated sampling tube are next connected to the end of the pipe extending above the surface for communication with the sampling head in the manner described here below. The sampling tube is kept closed and the entire system is flushed by pumping for several minutes after which the gas is sampled by opening the sampling tube. This arrangement of sampling apparatus in the test holes is illustrated in Figure 1 of the drawings.

Referring to Figure 1, numeral 1 designates the earth in which the borehole 2 has been sunk to a suitable depth, preferably below a water saturated zone, say for example, 6 feet. The sampling head 3 is shown in position at the bottom of the hole with the edge of its open end dug firmly into the earth. The area 4 at the bottom of the hole forms a test zone through which the soil gases enter the flow system from the stratum being sampled. One end of a small diameter pipe 5 is threadedly connected to the upper portion 6 of the sampling head. This connection is suitably sealed so that it is capable of holding a moderate vacuum. The opposite end of the pipe is made to extend to a point above surface level. To this latter end there is connected, by means of a thick walled rubber tube, or sleeve 7, a T joint 8. The T joint may be constructed of any suitable material such as glass or metal. T joint 8 is connected to a second T joint 9 by means of a rubber sleeve 10. Arm 11 of joint 9 having a stopcock, or valve 12, is likewise connected to a vacuum pump 13 by means of a rubber sleeve 14. An evacuated sampling tube 15, having a stopcock or valve 16 in a closed position, is connected to the T joint 9 by means of a rubber sleeve 17. Arm 18 of T joint 8 is connected to manometer 19 by means of a rubber sleeve 20. It is important that the rubber tubing used be of high quality and have a rather heavy wall, since it must withstand exposure to the elements and also provide air-tight connections.

After the sampling head, with pipe 5 attached, has been set in place as shown in the drawing, it is buried with several feet of dry dirt to form a packing 21. The remainder of the hole may then be filled with an aquagel mud 22. This procedure insures an air-tight seal around the edge of the sampling head enclosing the test zone 4 and prevents surface air from passing through the packing and by passing the seal.

In practice the pump 13 is placed in operation, the stopcock 12 is opened and the system is flushed for a short period of time in order to remove surface air therefrom. The system is then shut in by closing the stopcock 12. The sampling tube stopcock 16 is then opened and the system allowed to stand until the manometer 19 indicates that the pressure within the system is approximately atmospheric. The sampling tube stopcock is then closed and the tube, now containing the desired sample of soil gas, is removed from the system by detaching it from the sleeve 17.

The gas samples, collected from the various test holes in the field in the manner outlined above, are conveniently analysed for their oxygen and carbon dioxide contents by use of the following simple, well known method. A known volume of the gas sample is first treated by passing it several times through a carbon dioxide absorbing liquid, such as potassium hydroxide, the decrease in volume of the gas being measured after each pass. When the carbon dioxide has been completely removed, as shown by no further decrease in volume, the overall volume decrease, which is the amount of carbon dioxide originally present in the sample, is noted. The sample is then treated in a similar manner by passing it several times through an oxygen absorbing liquid, such as pyrogallol, the total decrease in volume produced by this treatment being noted as the amount of oxygen in the sample. The volume percentages of carbon dioxide and oxygen are then calculated in the manner well known.

The analytical results may be interpreted in any suitable manner in order to detect the significant anomalies, however, I generally prefer to determine the percent volume ratio of oxygen to carbon dioxide for each sample and then plot these values as a function of sampling locations in the field. For example, the ratio values for any series of samples taken along a traverse may be plotted as a function of traverse distance. A typical curve obtained in this manner is shown in Figure 2 of the drawings.

Referring now to Figure 2, the graph shows a curve 24 derived by plotting the oxygen-carbon dioxide values for a series of samples taken on a traverse, as ordinates, against the traverse sampling distances, as abscissae. This particular survey was conducted over the Talco oil field in northeast Texas. In order to illustrate the relationship between the oxygen-carbon dioxide ratio values found in the soil gas by this survey and the position of the oil pool, the curve obtained has been superimposed on a scale drawing in cross section of this field taken along the traverse line on which the sampling stations were situated. As shown in the drawing, the numeral 25 represents the earth's surface while 26, 27, 28, and 29, represent the different strata. The numerals 30 to 50, inclusive, represent sampling stations set out at 1000 foot intervals along the traverse. The oil pool is shown at 51, while 52 represents a 45° fault plane running east and west across the field.

The curve 24 shows a distinct anomaly, indicated by the peak 53, which begins approximately at station 38, reaches a maximum at station 43, and disappears rapidly beyond station 44. The stations over which the anomaly extends, viz., 38 to 44, are all situated in the productive area, i. e., over the pool. The background values of the oxygen-carbon dioxide ratios in samples taken in the area extending away from the pool are shown by the portions 54 and 55 of the curve.

It will be noted that although stations 36 and 37 are over the pool, the anomaly does not extend to these stations. Also, the peak 53 of the anomaly is displaced toward the right side of the pool, rather than appearing in the center thereof, as we have generally found. An interesting explanation for these phenomena is that they are due to the presence of the fault plane 52. This fault plane apparently acts to divert substances emanating upwards from the pool, which are related to the oxygen-carbon dioxide balance in the soil gas, so that the anomaly is greatest at stations 41, 42, and 43.

Numerous surveys conducted by the use of my method over known petroleum fields have produced similar anomalies. Various methods of interpretation were applied to the analytical data obtained in these surveys in order to determine which form of interpretation is capable of giving the clearest and most accurate results. For example, instead of plotting the ratio values for oxygen and carbon dioxide as described hereinabove, the sum values were plotted as a function of sampling location. Also, the values for the ratios divided by the sums were plotted in a similar fashion. It was found that the former procedure consistently produced characteristic negative anomalies over producing areas, while the latter gave positive anomalies, which were substantially equivalent to those obtained by use of the oxygen-carbon dioxide ratio values.

In describing my invention, I have indicated that I generally prefer to recover the soil gas samples from spaced points along a traverse, or a number of traverses in prospect area. However, it should be understood that my oxygen-carbon dioxide survey method may be applied equally well regardless of the particular sampling plan employed. Thus, for example, the method is applicable where sampling is conducted according to a grid or radial sampling pattern, or where no particular sampling scheme is followed, as in the soil gas mapping techniques. Furthermore, my invention embraces the use of methods wherein the oxygen-carbon dioxide balance in the soil gas is studied according to a vertical, rather than a horizontal, sampling plan in order to detect the presence of an underlying hydrocarbon deposit, since I found in several such surveys that the oxygen-carbon dioxide ratio values tend to rise the nearer the sampling points are to the pool.

Several distinct advantages accrue to the use of my method as compared to methods heretofore employed for soil gas surveying, particularly those which rely for their success upon the detection of hydrocarbons. Thus, the quantities of hydrocarbon gases in soil gas are generally of a very low order, and the methods available for their detection and analysis are time consuming and of doubtful accuracy. Furthermore, several investigators have observed that petroleum hydrocarbons may be readily destroyed by hydrocarbon consuming bacteria. And, as I have found by experience, there are some areas over known production where no soil gas hydrocarbon anomalies exist.

On the other hand, the analytical techniques for oxygen and carbon dioxide are simple, rapid and accurate. And since the method measures end products of processes which destroy hydrocarbon emanations, the decomposition of hydrocarbons offers no handicap. It should be emphasized, however, that these processes are not prerequisite to the operation of the invention, since simple admixture of hydrocarbons without decomposition is also detectable thereby.

Although the method of my invention is capable of detecting anomalous indications of petroliferous deposits when used as an independent prospecting method, it is an advantageous tool when used as a supplementary method in conjunction with other survey methods, such as, for example, the seismic or gravimeter methods. The method is especially useful in this latter connection in the detailing of areas where indications of structures have been found by geophysical methods.

From an economical standpoint, the cost of a survey by my method is relatively inexpensive, no specialized or complicated equipment being required. The analytical technique is not costly, and it has been found that under normal working conditions, i. e., good weather and accessible terrain, a 2-man crew can drill and sample an average of from 150 to 200 test holes (6 ft. deep) per month.

The terms "soil" and "earth" as used throughout the specification and claims denote not merely the surface or near surface portions of the earth in the prospect area, but are utilized in the broad sense to include the subsurface strata at any depth from which it may be desirable to recover soil gas samples for the purpose of this invention.

The foregoing description of my invention has included only certain exemplary embodiments thereof and my invention is therefore not to be construed as limited in any way except as indicated in the appended claims.

I claim:

1. A method of prospecting for petroliferous deposits in the earth which comprises collecting soil gas samples at each of a plurality of spaced boreholes in a prospect area below the soil breathing level and without contamination with atmospheric air, quantitatively determining the oxygen and carbon dioxide content of each sample, correlating and mapping the data obtained from both of said determinations so that an area of increased petroliferous deposits is outlined by the points of increasing values in the oxygen: carbon dioxide ratio.

2. A method of prospecting for petroliferous deposits in the earth which comprises collecting soil gas samples at each of a plurality of spaced boreholes in a prospect area below the soil breathing level and without contamination with atmospheric air, quantitatively determining the oxygen and carbon dioxide content of each sample, correlating and mapping values obtained from both of said determinations so that an area of increased petroliferous deposits is outlined by the points of anomalous variation in the values constituting a function of both the oxygen and carbon dioxide contents.

NELSON P. STEVENS.

REFERENCES CITED

The following references are of record in the file of this patent:

UNITED STATES PATENTS

| Number | Name | Date |
| --- | --- | --- |
| 2,183,964 | Horvitz | Dec. 19, 1939 |
| 2,261,764 | Horvitz | Nov. 4, 1941 |
| 2,321,293 | Hassler | June 8, 1943 |
| 2,330,829 | Lindberg et al. | Oct. 5, 1943 |